United States Patent [19]

Uozumi et al.

[11] 3,747,439
[45] July 24, 1973

[54] HYDRAULIC CONTROL SYSTEM FOR AUTOMATIC TRANSMISSIONS

[75] Inventors: Sumio Uozumi; Ichio Sakai, both of Toyota, Japan

[73] Assignee: Toyota Jidosha Kogyo Kabushiki Kaisha, Toyota-shi, Japan

[22] Filed: May 5, 1971

[21] Appl. No.: 140,328

[30] Foreign Application Priority Data
May 9, 1970 Japan.................................. 45/39435

[52] U.S. Cl..................................... 74/869, 74/864
[51] Int. Cl............................................. B60k 21/00
[58] Field of Search........................................ 74/869

[56] References Cited
UNITED STATES PATENTS

| | | | |
|---|---|---|---|
| 3,014,383 | 12/1961 | Flinn................................. | 74/869 X |
| 3,438,285 | 4/1969 | Hanzi et al............................ | 74/869 |
| 3,509,784 | 5/1970 | Mahoney.............................. | 74/869 |

*Primary Examiner*—Arthur T. McKeon
*Attorney*—Toren & McGeady

[57] ABSTRACT

A hydraulic control system for automatic transmissions having hydraulic servos for actuating friction engagement means comprises an oil pump for producing an oil pressure to be supplied to the servos, a pressure regulator valve for producing a desired line pressure in dependence on the speed and the output of an engine, a throttle valve for producing a throttle pressure corresponding to the throttle valve opening of the engine, a governor valve for producing a governor pressure corresponding to the engine speed, a manual valve for selectively distributing the line pressure to the servos, a 1-2 shift valve for accomplishing shift between a first and a second speed condition in dependence on the running condition of the vehicle controlled by the throttle pressure and the governor pressure, a 2-3 shift valve for accomplishing shift between the second and a third speed condition, an accumulator unit for slowing down supply of the line pressure to the servo for the third speed, a 2-3 timing valve for providing the timing of the up-shift or the down-shift between the second and third speed condition and an orifice control valve for controlling supply of the line pressure to the servo for the second speed. The supply of the line pressure to the servo for the third speed upon upshift from the second speed condition to the third speed condition is slowed down by the accumulator unit and the time for exhausting the servo for the second speed is determined by the 2-3 timing valve whereby an overlap of engagement and disengagement of the friction engagement means is provided. The overlap may be varied in dependence on the throttle pressure. Upon downshift from the third speed condition to the second speed condition, the servo for the third speed is relieved of pressure, and the 2-3 timing valve determines the time for supplying the line pressure to the servo for the second speed in dependence on the throttle pressure. Further the orifice control valve controls flow of the line pressure so that a desired overlap may be provided as in the case of upshift.

6 Claims, 6 Drawing Figures

HYDRAULIC CONTROL SYSTEM FOR AUTOMATIC TRANSMISSIONS

BACKGROUND OF THE INVENTION

The present invention relates to an automatic transmission for automotive vehicles having at least two friction engagement means actuated by hydraulic servos for changing speed ratios, and more particularly to a hydraulic control system therefor.

In general, pressure relief of one of the servos and pressure supply of the other are required for the purpose of the speed change in the automatic transmission. A smooth speed change requires good timing of the relief and the supply of fluid pressure to the servos in accordance with various conditions. Otherwise, both of the servos would be relieved or come to the neutral position at the same time. This would cause the engine to overrun or make engine braking impossible. Conversely, if the both servos should be supplied with pressure at the same time, there might occur unfavorable phenomena such as dragging of the friction engaging means and the shock in speed change. A principal object of the present invention is to provide suitable timing of the application and release of the servos for actuating transmission friction engagement means according to different conditions.

It is another object of the invention to provide an overlap in the application and release of the servos for actuating friction engagement means upon upshift or downshift between a low speed condition and a high speed condition.

It is a further object of the invention to mitigate the shock during speed change.

It is another object of the invention to prevent the engine from overrunning upon gear shift.

SUMMARY OF THE INVENTION

Briefly, the present invention may be described as a control system for an automatic transmission for an engine driven vehicle, said transmission comprising speed change gearing having at least two frictional engagement means and a first and a second associated hydraulic servo means for respectively actuating said engagement means, with pressure supply of said first servo means and pressure relief of said second servo means providing a first speed condition, and with pressure relief of said first servo means and pressure supply of said second servo means providing a second speed condition. The present invention is particularly characterized by the combination of shift valve means controlled in response to both engine output and vehicle speed to pressurize or relieve said first servo means, and timing valve means responsive to the pressure supply in said first servo means for relieving said second servo means when the supply pressure to said first servo means exceeds a predetermined value with respect to the output of the engine and for pressurizing said second servo means when said supply pressure to said first servo means decreases below said predetermined value. The timing valve means is made responsive to the output level of the engine and operates to control the timing of pressure supply and relief to said second servo means in dependence thereupon whereby there may be provided an overlap in the shifting operation of the first and second servo means between said first and second speed conditions.

BRIEF DESCRIPTION OF THE DRAWINGS

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

In the drawings:

FIG. 4 is an enlarged view of a part of the system of FIG. 3, and FIGS. 5 and 6 are diagrams illustrating the servo pressures during upshift and downshift between a high speed and a low speed condition.

DETAILED DESCRIPTION OF A PREFERRED EMBODIMENT

Figure 1:
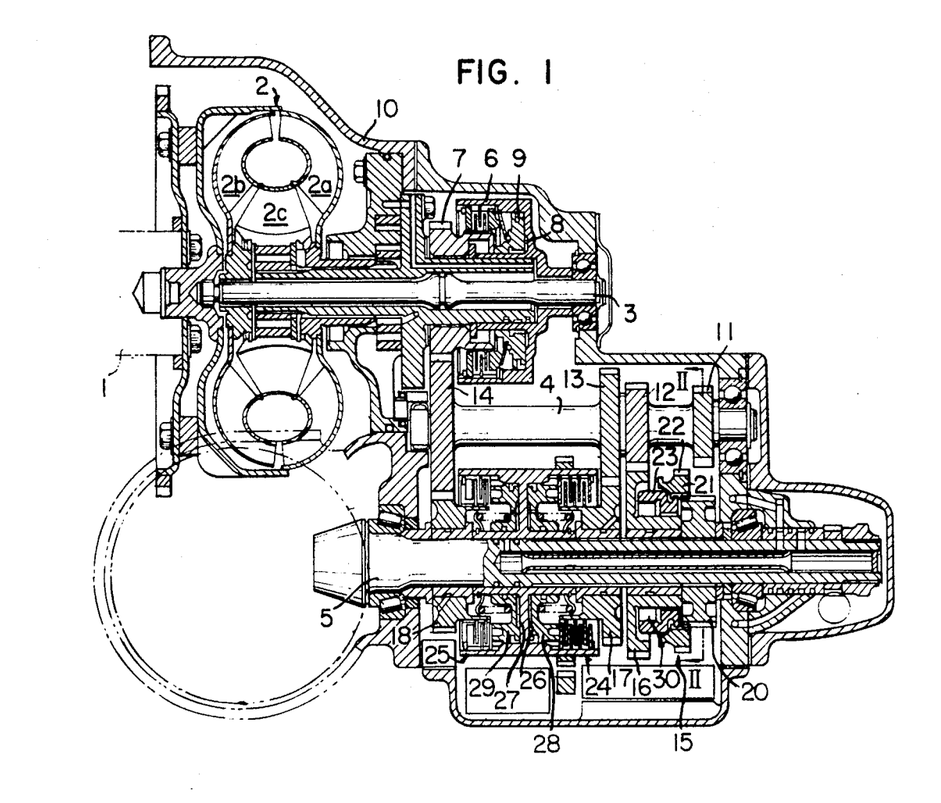
FIG. 1 is a vertical cross sectional view of an automatic transmission according to the present invention.
Figure 2:
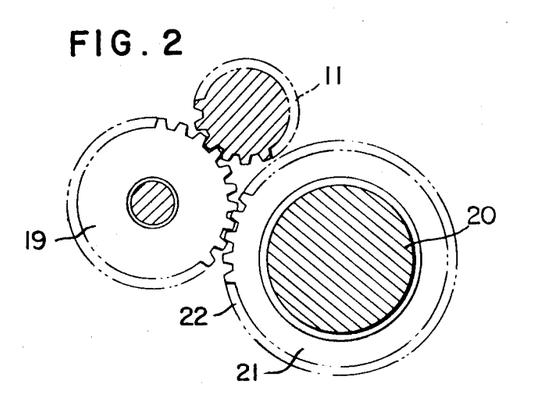
FIG. 2 is a cross sectional view taken along line II—II of FIG. 1.

FIGS. 1 and 2 show a three forward speed and one reverse-drive transmission of the front engine-front drive (F — F) or rear engine-rear drive (R — R) type.

The reference numeral 1 denotes the output shaft of an engine (not shown), 2 a torque converter, 3 the input shaft of the transmission, 4 an intermediate shaft, and 5 the output shaft of the transmission. The output shaft 1 of the engine and the input shaft 3 of the transmission are coaxially arranged while the input shaft 3, the intermediate shaft 4 and output shaft 5 are arranged in parallel. These shafts 1, 3, 4 and 5 are supported in a gear case 10.

The torque converter 2 of any known type consists substantially of a pump runner 2a, turbine runner 2b and a stator 2c. The output shaft 1 of the engine is connected to the pump runner 2a of the torque converter 2, and the input shaft 3 is connected to the turbine runner 2b of the torque converter 2. On the input shaft 3 is arranged a transmitting gear 7 which may be operatively connected to said shaft 3 by means of a multiple disc clutch 6. When servo oil pressure is supplied to an oil chamber 8 of the clutch 6, a piston 9 within the chamber moves to bring the clutch discs into engagement. Conversely, removal of the servo oil pressure in the oil chamber 8 releases the clutch 6.

On the intermediate shaft 4 are fixedly mounted a gear 11 for reverse drive, a gear 12 for first speed, a gear 13 for second speed and a gear 14 for third speed, respectively, with the third speed gear 14 engaging the transmitting gear 7 on the input shaft 3. When the multiple disc clutch 6 is in engagement, the power of the input shaft 3 is transmitted through the gears 7 and 14 to the intermediate shaft 4 thereby keeping the gears 11, 12, 13 and 14 in rotation.

On the output shaft 5 are rotatably mounted gears 16, 17 and 18 for first, second and third speeds, which mesh, respectively, with the first, second and third speed gears 12, 13 and 14 on the intermediate shaft 4. As shown in FIG. 2, the reverse drive gear 11 on the intermediate shaft 4 meshes with an idler gear 19 supported rotatably in the gear case 10.

Means 15 is provided for selectively connecting the first speed gear 16 and the idler gear 19 to the output shaft 5. For this purpose an externally splined hub 20 is fixedly mounted on the output shaft 5 in the same plane as the reverse drive gear 11 on the intermediate shaft 4 and the idler gear 19. A hub sleeve 21 is axially slidably fitted on the hub 20. An external toothing 22 formed on the periphery of the hub sleeve 21 may mesh with the idler gear 19. On the left side of the hub 20 there is provided a splined body 23 which is fixedly mounted on the first speed gear 16. This splined body 23 has the same outer diameter as that of the hub 20 so that the hub sleeve 21 upon leftward movement may engage with the splined body 23. The hub sleeve 21 when resting on the hub 20 meshes with the idler gear 19, and upon leftward movement comes out of engagement with the idler gear 19 and comes into engagement with the splined body 23 so that the first speed gear 16 and the hub 20 are connected to each other. The first speed gear 16 is provided with a one-way clutch 30.

Two multiple disc clutches 24 and 25 are disposed between the second and third speed gears 17 and 18 each for connecting the gear 17 or 18 to the output shaft 5. The multiple disc clutches 24 or 25, whose oil chambers 26 or 27 are supplied with servo pressure, engage the discs with each other. Conversely, when the oil chamber 26 or 27 is relieved of the servo pressure, the multiple disc clutchs 24 or 25 are disengaged.

Thus, the transmission constructed as described may establish three forward speeds and one reverse drive upon selective operation of the clutches 6, 24, 25 and the of selective connecting means 15, as will be described hereinafter.

FIRST SPEED

The hub sleeve 21 is moved leftwardly so that the splined body 23 and the hub 20 are connected and the clutch 6 is applied. Then the rotation of the input shaft 3 is transmitted to the gear 16 at a reduced speed through the clutch 6, the gears 7, 14, the intermediate shaft 4, and the gear 12. As described above, since the splined body 23 and the hub 20 are connected through the hub sleeve 21, the rotation of the gear 16 is transmitted through the one-way clutch 30 to the output shaft 5, whereby first speed is obtained.

SECOND SPEED

The hub sleeve 21 remains in its lefthand position, and the clutch 6 and the clutch 24 for second speed are applied. The rotation of the gear 13 for the second speed is transmitted through the gear 17 and the through clutch 24 at another reduced speed which is higher than in the first gear.

THIRD SPEED

The hub sleeve 21 remains in the left-hand position, and the clutch 6 and the clutch 25 for third speed are applied. The rotation of the input shaft 3 is transmitted through the gears 14, 18 and through applied clutch 25 to the output shaft 5 at a further reduced speed which is higher than the speed in second gear, whereby a third speed is obtained. In this stage the third speed gear 14 on the intermediate shaft 4 operates as an idler gear. Therefore the speed change ratio is determined by the gear ratio between the transmitting gear 17 on the input shaft 3 and the third speed gear 18 on the output shaft 5. When the numbers of teeth of the gears 7 and 18 are the same, the speed change ratio for the third speed will be 1.00.

REVERSE DRIVE

The hub sleeve 21 is moved rightwardly, and the clutch 6 is applied. The hub sleeve 21 then comes into engagement with the idler gear 19 to provide power flow from the reverse drive gear 11 on the intermediate shaft 4 through the idler gear 19, the hub sleeve 21, and the hub 20 to the output shaft 5. Since the idler gear 19 is inserted in the power flow, the power of the input shaft 3 is transmitted to the output shaft 5 in a reverse direction.

Figure 3:
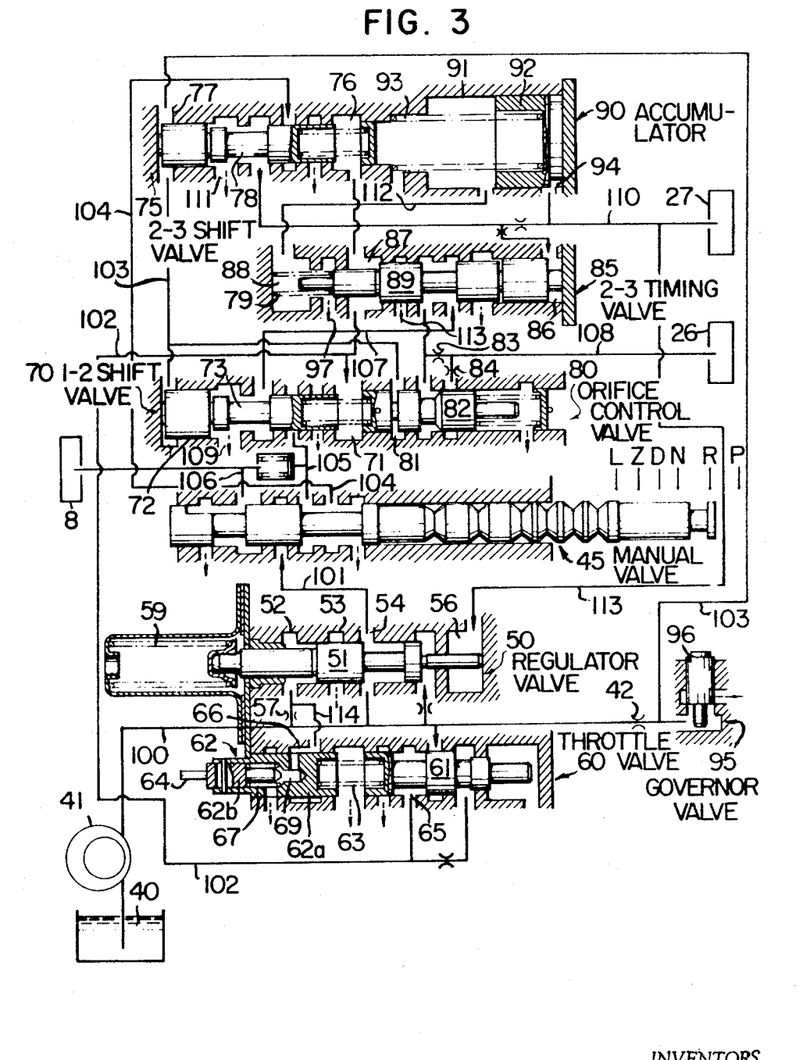
FIG. 3 is a schematic sectional diagram showing a hydraulic control circuit system for controlling the transmission shown in FIG. 1.

The speed change by the transmission mentioned above may be conducted by supplying or relieving hydraulic pressure (referred to hereinafter as "line pressure $P_L$") to or from the oil chamber 8, 26 or 27 of the multiple disc clutch 6, 24 or 25. This operation is effected by an hydraulic circuit system as shown in FIG. 3, which is composed substantially of the following components.

| | |
|---|---|
| Oil reservoir 40 | 2–3 Shift valve 75 |
| Oil pump 41 | Orifice control 80 valve |
| Pressure regulator valve 50 | 2–3 Timing valve 85 |
| Throttle valve 60 | Accumulator unit 90 |
| Manual valve 45 | Governor valve 95 |
| 1–2 Shift valve 70 | |

These components will be further explained hereinafter.

An oil pump 41 which is driven directly by an engine, sucks oil from the oil reservoir 40 and develops in a passage 100 the line pressure $P_L$ to be supplied to the servo chambers of the multiple disc clutches 6, 24 and 25.

A pressure regulator valve 50 regulates the line pressure $P_L$ in the passage 100 at an appropriate value in accordance with different running conditions of the vehicle. For this purpose the line pressure $P_L$ in the passage 100, which is supplied to an oil chamber 54 of the regulator valve 50, is regulated by a control connection between an exhaust passage 53 and the chamber 54. This control may be effected in dependence on the existence of pressure in oil chambers 52 and 56 of the regulator valve 50. The oil chamber 52 communicates with the passage 100 through an orifice 57 and an oil chamber 66 in a plug 62 of the throttle valve 60 which will be described later. The plug 62 of the throttle valve 60 operates in such a manner that the oil chamber 66 in the plug 62, and therefore the oil chamber 52 of the regulator valve 50 are free from pressure oil at a throttle valve opening of the engine less than a predetermined value, for example, one-fourth opening, and are supplied with the pressure oil at a throttle valve opening more than one-fourth opening. When the pressure oil exists in the oil chamber 52, it acts together with a biasing coil spring 59 on a valve spool 51 in a rightward direction so that the line pressure $P_L$ controlled in the oil chamber 54 is obtained as a higher pressure. Conversely, when the oil chamber 52 is free from pressure oil, no pressure in the chamber 52 acts on the valve spool 51 so that the line pressure $P_L$ controlled in the oil chamber 54 is obtained as a lower pressure in equilibrium with the biasing force of the coil spring 59. Since this lower pressure is obtained at an engine throttle valve opening less than 1/4 opening, the shock due to change in the position of the manual valve 45 can be mitigated. In normal running of the engine at a throttle valve opening more than one-fourth opening, a necessary and sufficient amount of pressure assures friction engagement of the clutches.

Another oil chamber 56 of the regulator valve 50 communicates with a pressure supply passage 110 for the third speed clutch 25 through a passage 113. The existence of pressure in the oil chamber 56 depends on the operation of the third speed clutch 25. The oil chamber 27 of the third speed clutch 25 in engaged condition is supplied with the line pressure $P_L$ which also exists in the oil chamber 56 through the passage 113. On the other hand, in the first or second speed operation of the transmission, the line pressure $P_L$ does not exist in the passage 110 for the third speed clutch 27, nor in the oil chamber 56. Since the pressure, which exists in the oil chamber 56, will act on the valve spool 51 against the biasing force of the coil spring 59, the line pressure $P_L$ controlled in the oil chamber 54 may be obtained as a lower pressure. Conversely, without pressure in the oil chamber 56, a higher pressure may be obtained in the oil chamber 54. The lower pressure is obtained under the third speed condition of the transmission, which condition continues for a predominantly longer period during operation of the vehicle. This reduces the power loss with a resulting increase of efficiency, and it also prevents the occurrence of noises from the pump.

The throttle valve 60 produces an oil pressure corresonding to the throttle valve opening of the engine as a parameter of the engine output torque. This throttle valve 60 consists of a valve spool 61, a plug 62 and a coil spring 63 disposed therebetween. The plug 62, which is linked to an accelerator pedal and therefore to the throttle valve of the engine through a throttle lever 64 moves in a leftward or rightward direction in accordance with the valve opening. The rightward movement of the plug 62 is transmitted through the coil spring 63 to the valve spool 61 which produces in an oil chamber 65 a pressure corresponding to the force acting thereon. This pressure which is supplied to a passage 102 will be referred to hereinafter as "throttle pressure $P_{th}$". The throttle pressure $P_{th}$ increases with the throttle valve opening.

The plug 62 of the throttle valve 60 consists substantially of a plug body 62a, a pilot valve 62b and a coil spring 67 disposed therebetween. The pilot valve 62a controls a path 69 in the plug body in communication with an oil chamber 66. At a throttle valve opening less than one-fourth opening, the pilot valve 62b keeps the path 69 open under the action of the coil spring 67, while at a throttle valve opening more than one-fourth opening the pilot valve 62b moves rightwardly against the force of the coil spring 67 and shuts off the path 69. When the path 69 is opened, the oil pressure in the oil chamber 66 of the plug 62 is relieved through the opened path 69 so that no pressure exists in the chamber 66. When the path 69 is closed, the pressure oil exists in the chamber 66. Since the oil chamber 66 of the plug 62 communicates with the oil chamber 52 of the regulator valve 50 through a passage 114, the existence of the pressure oil in the oil chamber 66 controls the line pressure $P_L$ at the regulator valve 50 as has been described. The coil spring 67 is designed weaker then the coil spring 63.

The governor valve 95 is mounted on the output shaft 5 of the transmission. Its valve spool 96 is subjected to a centrifugal force corresponding to the rotating speed of the output shaft 5 and produces an oil pressure corresponding to the centrifugal force. The governor valve 95, which is supplied with pressure oil from the passage 100 through an orifice 42, produces in a passage 103 an oil pressure corresponding to the rotating speed of the output shaft (vehicle speed). The pressure control at the governor valve 95 and then supplied to the passage 103 will be called "governor pressure $P_{go}$." The governor pressure $P_{go}$ increases with the rotating speed of the output shaft 5.

The manual valve 45 is a distributing valve which distributes the line pressure $P_L$ in the passage 101 controlled at the regulator valve 50 to the hydraulic servos to obtain the required shifting conditions. This manual valve 45 is linked to a shift lever in a driver's cab (not shown) ane may be shifted in its position by a driver. The manual valve as shown has six positions, i.e. parking range (P-position), reverse range (R-position), neutral range (N-position), drive range (D-position), second range (2-position), and low range (L-position).

P-position is employed in parking of the vehicle. In P-position, a pawl (not shown) coupled to the manual valve locks the gear (not shown) on the output shaft so as to prevent the vehicle from moving. For reverse drive of the vehicle R-position is employed, in which the line pressure $P_L$ in the passage 101 is distributed to the passage 106. N-position is employed to obtain the neutral condition, in which the line pressure $P_L$ in the passage 101 is not distributed to any of passages. This N-position is shown in FIG. 3. D-position is employed to obtain automatic shifting between the first speed, the second speed and the third speed. In this position, the line pressure $P_L$ in the passage 101 is distributed to the passages 104 and 105. 2-position is employed to effect the shifting between the first speed and the second speed in which the line pressure $P_L$ in the passage 101 is distributed to the passages 105 and 106. In this 2-position, the third speed is not obtained. L-position is employed only for the first speed, in which the line pressure $P_L$ in the passage 101 is distributed to a passage 106. This L-position does not give the second and third speeds.

The 1-2 shift valve 70 is provided to effect shifting between the first and the second speed of the transmission in accordance with the operating condition of the vehicle at D- and 2-positions of the manual valve 45. This 1-2 shift valve 70 operates in response on the vehicle speed and the engine throttle valve opening as parameters of operating condition of the vehicle. More particularly, a right-hand oil chamber 71 of the 1-2 shift valve 70 is supplied with the throttle pressure $P_{th}$ corresponding to engine throttle valve opening through the passage 102, while a left-hand oil chamber 72 is under the governor pressure $P_{go}$ corresponding to the vehicle speed through the passage 103. Thus, the valve spool 73 of the 1-2 shift valve 70 moves in accordance with the pressure difference between the governor pressure $P_{go}$ and the throttle pressure $P_{th}$. When the throttle pressure $P_{th}$ acting on the valve body 73 is larger than the governor pressure $P_{go}$, the valve body 73 assumes the position as shown. The passage 107 to the servo oil chamber 26 of the clutch 24 for the second speed communicates with a pressure relief passage 109 and is relieved of pressure so that the clutch 24 for the second speed is not applied and the transmission remains in the first speed position. When the vehicle speed becomes higher and the governor pressure $P_{go}$ exceeds the throttle pressure $P_{th}$, the valve body moves rightwardly so that the passage 105 from the manual valve 45 communicates with the passage 107 to the clutch 24 for the second speed. Accordingly, the line pressure $P_L$ in the passage 105 is supplied through the 1-2 shift valve 70 and the passages 107, 108 to the servo oil chamber 26 of the clutch 24 for the second speed, which is then applied. Thus, the transmission is automatically shifted from the first speed position to the second speed position.

The orifice-control valve, located in the passage 108 to the servo oil chamber 26 of the clutch 24 for the second speed controls the flow rate of the line pressure $P_L$ supplied to the servo oil chamber 26 at the time of shifting to the second speed thereby mitigating the shock of speed change. A valve spool 82 of the orifice control valve 80 is actuated by the governor pressure $P_{go}$ supplied from the passage 103 to a left-hand oil chamber 81 and operates to close-open-close with increase of the governor pressure $P_{go}$. Consequently, when the governor pressure $P_{go}$ and therefore the vehicle speed, is extremely low or high, the orifice control valve 80 is closed so that the oil pressure is supplied slowly to the servo oil chamber 26 of the clutch 24 for the second speed through only an orifice 83. When the vehicle speed, and therefore the governor pressure, is medium or usual and neither low nor high, the orifice control valve 80 is then opened so that the servo oil chamber 26 of the clutch 24 for the second speed is supplied with the oil pressure through both the orifice 83 and an orifice 84 in series with the orifice control valve 80. Thus, the oil supply is provided more quickly than in the case where vehicle speed is either low or high.

Figure 4:
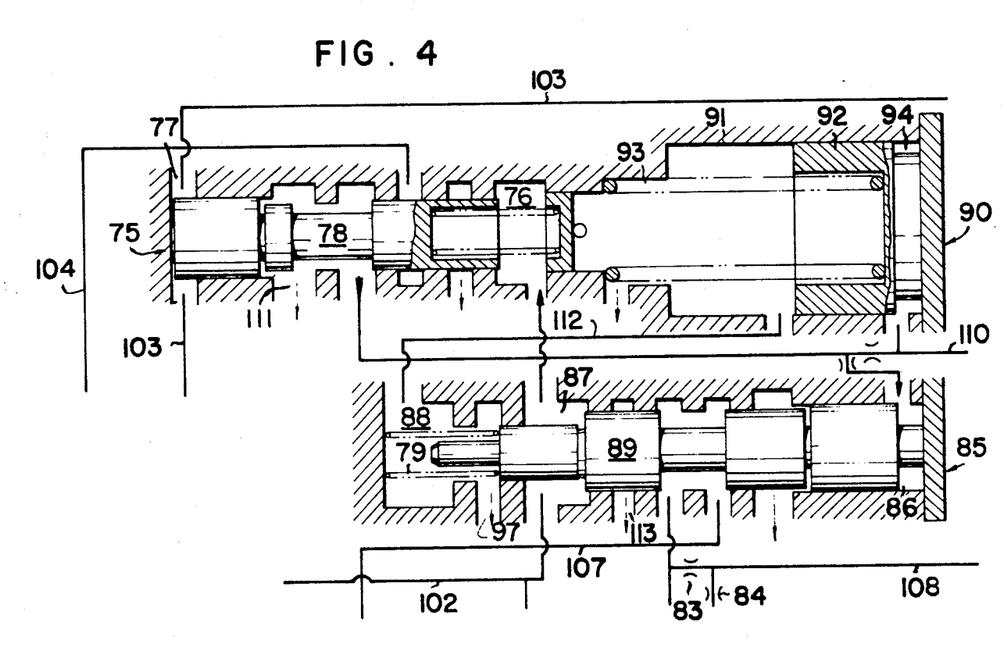

The 2-3 shift valve 75, the accumulator unit 90 and the 2-3 timing valve 85, which are essential for the present invention, will now be described in connection with FIG. 4.

The 2-3 shift valve 75 is adapted to effect shifting between the second speed and the third speed of the transmission in accordance with the running condition of the vehicle at the D-position of the manual valve 45. This 2-3 shift valve operates in a similar manner to the 1-2 shift valve 70. A right-hand oil chamber 76 of this 2-3 shift valve 75 is exposed to the throttle pressure $P_{th}$ through the passage 102 while a left-hand oil chamber 77 is under the governor pressure $P_{go}$ through the passage 103. When the throttle pressure $P_{th}$ acting on a valve spool 78 is larger than the governor pressure $P_{go}$, the valve spool 78 assumes the position as shown. The passage 110 to the servo oil chamber 27 of the clutch 25 for the third speed communicates with a pressure relief passage 111 and is relieved of pressure. Consequently the clutch for the third speed is not applied and the transmission is in the first or second speed condition under the action of the 1-2 shift valve 70. When as a result of increase in the vehicle speed, or the governor pressure $P_{go}$ becomes higher than the throttle valve pressure $P_{th}$, the valve spool 78 is moved rightwardly so that the passage 104 from the manual valve 45 communicates with the passage 110 to the clutch 25 for the third speed. Accordingly, the line pressure $P_L$ in the passage 104 is supplied through the 2-3 shift valve 75 and the passage 110 to the servo oil chamber 27 of the clutch 25 thereby applying the clutch 25 for the third speed. While the servo oil chamber 27 of the clutch 25 is supplied with the line pressure $P_L$, the line pressure $P_L$ in the passage 108 which has been supplied to the servo oil chamber 26 of the clutch 25 is relieved through the 2-3 timing valve 85 so that the transmission is shifted from the second speed position to the third speed position. The pressure responsive area of the valve spool 78 of the 2-3 shift valve 75 is so dimensioned that the 2-3 shift valve may provide the third speed only when the 1-2 shift valve 70 has provided the second speed.

The accumulator unit 90, provided in the passage 110 to the clutch 25 for the third speed, is intended to assure slow application of the line pressure $P_L$ to the servo oil chamber 27 of the clutch 25 for the third speed. This accumulator system 90 is composed of a cylinder 91, a piston 92 slidably fitted therein and a coil spring 93 for urging the piston rightwardly. When the 2-3 shift valve operates to provide the third speed, the line pressure $P_L$ in the passage 110 is supplied to a right-hand chamber 94 of the accumulator unit 90. When the line pressure $P_L$ rises enough to overcome the biasing force of the coil spring 93, it causes the piston 92 to move leftwardly. Since the oil pressure in the passage 110 remains in equilibrium with the force of the coil spring 93 for a certain period of time during movement of the piston 92, the engaging operation of the clutch 25 for the third gear will proceed at a correspondingly slower rate. After the piston 92 of accumulator unit 90 has moved to the extreme left, the communication between the passages 110 and 112 will be established.

The 2-3 timing valve 85 is adapted for determining the shift timing either of upshift from the second speed to the third speed or of downshift from the third speed to the second speed. A right hand oil chamber 86 of the 2-3 timing valve 85 is supplied with the oil pressure in the passage 110 to the clutch 25 for the third speed, and a left hand oil chamber 87 is supplied with the throttle pressure $P_{th}$ in the passage 102.

Further, the leftmost oil chamber 88 is supplied with the oil pressure in the passage 112 which is in communication with the passage 110 through the accumulator unit 90 with the piston 92 moved leftwardly. In the second speed condition, the line pressure $P_L$ does not exist in the passage 110, and the oil chambers 86 and 88 are free from the oil pressure. The valve body 89 then assumes the position shown as a result of the throttle pressure $P_{th}$ in the oil chamber 87 and of the force of the coil spring 79 thereby to establish communication between the circuits 107 and 108. Therefore, the line pressure $P_L$, when supplied into the passage 107 from the 1-2 shift valve 70, is distributed to the servo oil chamber 26 through the passage 108 thereby engaging the clutch 24 for the second speed. On the other hand, when the 2-3 shift valve 75 is shifted to the third speed position, the line pressure $P_L$ is supplied to the oil chamber 86 through the circuit 110 and acts on the valve body 89 against the rightward force of the coil spring 79 and the throttle pressure $P_{th}$. When the oil pressure in the oil chamber 86 overcomes said rightward force, the valve spool 89 moves leftwardly and shuts off the passages 107 and 108 for the clutch 24 and establishes communication of the passage 108 with an exhaust passage 113 thus relieving the pressure oil from the servo oil chamber 26 of the clutch 24 for the second speed whereby the clutch 24 for the second speed is released.

Figure 5:
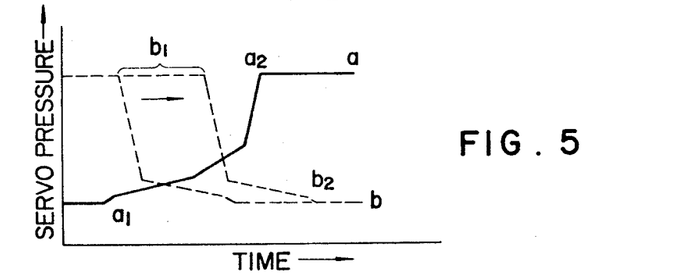

FIG. 5 illustrates variation of the pressure in the servo oil chamber 26 of the clutch 24 for the second speed and that of the pressure in the servo oil chamber 27 of the clutch 25 for the third speed upon shift from the second speed to the third speed. A solid line a shows the pressure in the servo oil chamber 27 for the third speed, and a broken line b shows the pressure in the servo oil chamber 26 for the second speed. As is evident from the diagrams, the pressure in the servo oil chamber 27 for the third speed rises gradually from a point $a_1$ of shifting to the third speed by the 2-3 shift valve 75 and finally reaches a point $a_2$ at which the clutch 25 for the third speed will be brought into engagement. During this engaging operation of the clutch 25, when the pressure in the servo oil chamber 27 has reached a predetermined value on the line a, exhaust of the pressure oil in the servo oil chamber 26 for the second speed is initiated at a point $b_1$ at a rapid rate through the 2-3 timing valve 85 and is completed at a point $b_2$ thereby releasing the clutch for the second speed. Thus, during the engaging and disengaging operations of both clutches, an overlap of said operations can be obtained. This overlap may be changed in dependence on the value of the throttle pressure $P_{th}$. In more detail, when the throttle pressure $P_{th}$ at the said 2-3 timing valve 85 is small, the rightwardly acting force onto the valve spool 89 is also small so that the valve spool 89 is moved under a relatively low pressure in the oil chamber 86. Thus the servo oil chamber 26 for the second speed may be exhausted relatively early and therefore the point $b_1$ assumes a more leftward position. Under this condition, there occurs a smaller overlap. When the throttle pressure $P_{th}$ becomes higher, the valve spool 89 does not move until the pressure in the oil chamber 86 attains a correspondingly high pressure, and therefore pressure relief from the servo oil chamber 26 for the second speed becomes gradually delayed and the point $b_1$ is shifted rightwardly. In other words, the overlap increases as the throttle pressure $P_{th}$ becomes higher. It is desirable to vary the amount of overlap upon speed change according to the throttle pressure $P_{th}$ or the engine output. It is especially favorable to increase the overlap with increase in the engine output.

The pressure oil in the oil chamber 88 of the 2-3 timing valve 85 is effective upon shifting from the second to the third speed since the valve spool 89 in the position as shown establishes communication between the exhaust passage 97 and the oil chamber 88. When the valve spool 89 is moved leftwardly to shut off the communication between the exhaust passage 97 and the oil chamber 88, the pressure oil in the oil chamber 88 will act on the valve spool 89. Since the oil chamber 88 is not supplied with the oil pressure from the passage 110 until the piston 92 of the accumulator unit 90 has completed its leftward movement, the oil chamber 88 is free from the pressure oil at the time of shifting from the second to the third speed and does not produce any force. The working force of the pressure oil in the oil chamber 88 is selected to be smaller than that in the oil chamber 86.

After completion of shifting to the third speed, the force due to the pressure oil in the chamber 86 which has acted on the valve spool 89 upon shifting from the second to the third speed is reduced by the opposing force of the pressure oil in the oil chamber 88. Consequently, when the transmission mechanism is shifted from the third to the second speed by the 2-3 shift valve, the pressure oil in the oil chamber 27 of the clutch 25 for the third speed is exhausted through the passage 110 to the exhaust passage 111. At the same time, the pressure oil in the oil chambers 86 and 88 of the 2-3 timing valve 85 is also exhausted, and the valve spool 89 is moved rightwardly under the throttle pressure $P_{th}$ in the oil chamber 87 to establish communication between the passages 107 and 108, thereby permitting pressure oil to be supplied to the servo oil chamber 26 of the clutch 24 for the second speed whereby the second speed condition is provided. As described above, since the pressure in the oil chamber 86 is opposed by that in the oil chamber 88, the movement of the valve spool 89 of the 2-3 timing valve 85 is at a relatively rapid rate whereby the overlap in the operation of both clutches 24 and 25 may be attained.

Figure 6:
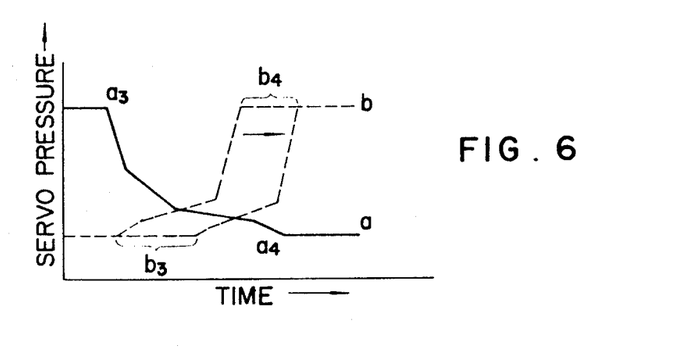

FIG. 6 shows variation of the oil pressure in the servo oil chambers 26, 27 for clutch systems 24, 25 upon shifting from the third to the second speed, in a manner similar to that of FIG. 5. As is clear from the diagram, relief of the pressure oil in the oil chamber 27 of the clutch 25 for the third speed is initiated at a point $a_3$ by shifting of the 2-3 shift valve 75. At a time when the pressure has decreased below a predetermined value, the 2-3 timing valve 85 operates at a point $b_3$ whereby pressure oil is supplied through the orifice control valve 80 to the servo oil chamber 26 of the clutch 24 to provide the second speed. In this speed change condition the overlap may also be obtained as in the case of shifting from the second speed to the third speed. The degree of overlap upon shifting from the third speed to the second speed will be changed in dependence on the throttle pressure $P_{th}$. In other words, at a relatively high throttle pressure, the valve spool 89 of the 2-3 timing valve 85 moves rightwardly to provide lessened relief of the passage 110 so that the point $b_3$ is shifted leftwardly to provide a larger overlap. Conversely, with decrease in the throttle pressure $P_{th}$ the point $b_3$ is shifted rightwardly thus reducing the overlap. For favorable speed change performance, it is also desirable to vary the amount of overlap in dependence on the throttle pressure $P_{th}$ or the engine output during downshift from the third to the second speed.

As described above, according to the present invention, there is provided the 2-3 timing valve which operates with the supply pressure oil to the clutch for the third speed to provide an appropriate overlap characteristic at the time of shifting from the second speed to the third speed. Consequently, the hydraulic transmission may be smoothly shiftdd from the second to the third speed without coming into the neutral condition thereby preventing the engine from overrunning and mitigating the shock during speed changing.

Since the pressure to the clutch for the third speed is reduced upon shifting from the second to the third speed, the 2-3 timing valve operates relatively early so that an appropriate overlap characteristic may be obtained in this shifting operation. Similarly, since the transmission does not assume the neutral condition, overrunning of the engine upon kick-down from the third to the second speed may also be avoided. In addition, upon shifting from the third to second speed, the oil chamber 88 is kept from being exhausted to the passage 97, and this permits stabilization of the line pressure $P_L$ upon shifting.

Furthermore, since the overlap characteristic obtainable upon shifting between the second speed and the third speed depends on the throttle pressure $P_{th}$ as a parameter of the engine output, and will be larger at a higher throttle pressure $P_{th}$, favorable speed change is assured.

Upon downshift from the third to the second speed, it is not always necessary that supply of pressure oil to the oil chamber 88 be effected after the accumulator unit 90 has operated. It will be possible to provide a direct communication between the oil chamber 88 and the passage 110. In this case, however, the oil will be unfavorably exhausted from the oil chamber 88 to the exhaust passage 97 at the time of shifting from the second to the third speed.

While a specific embodiment of the invention has been shown and described in detail to illustrate the application of the principles of the invention, it will be understood that the invention may be embodied otherwise without departing from such principles.

What is claimed is:

1. In an automatic transmission for an engine driven vehicle including an engine, speed change gearing having at least two frictional engagement means and a first and a second associated hydraulic servo means for respectively actuating said engagement means, pressure supply means, and means for transmitting pressure from said supply means to said first and second servo means, with pressure supply of said first servo means and pressure relief of said second servo means providing a first speed condition, and with pressure relief of said first servo means and pressure supply of said second servo means providing a second speed condition, the combination comprising:

shift valve means controlled in response to both the output of said engine and the speed of said vehicle to pressurize or relieve said first servo means; and timing valve means responsive to pressure supply in said first servo means for relieving said second servo means when the supply pressure to said first servo means exceeds a predetermined value with respect to the output of said engine and for pressurizing said second servo means when said supply pressure to said first servo means decreases below said predetermined value;

said timing valve means being responsive to the output level of said engine to control the timing of pressure supply and relief to said second servo means in dependence thereupon thereby to provide overlap in the shifting operation of said first and second servo means between said first and second speed conditions.

2. An automatic transmission as claimed in claim 1, comprising a passage means for establishing direct communication between the pressure supply to said first servo means and said second valve chamber of said timing valve means.

3. An automatic transmission according to claim 1, wherein said timing valve means comprises a first pressure chamber, a second pressure chamber, a third pressure chamber and control means movable in response to the pressure in said first, second and third chambers to control pressure supply to said second servo means, said first and said second chambers having applied thereto the supply pressure to said first servo means and being arranged to have the respective pressures therein act upon said control means in opposing relationship with said second chamber having a pressure area acting upon said control means which is smaller than that of said first chamber, said third valve chamber having applied thereto a pressure which is representative of said engine output and being arranged to have the pressure therein act upon said control means in opposed relationship to the pressure in said first chamber.

4. An automatic transmission according to claim 3 wherein the degree of said overlap is determined by the output level of said engine.

5. An automatic transmission according to claim 3, comprising accumulator means for establishing pressure communication between said first servo means and said second chamber of said timing valve means, said accumulator means operating to apply the supply pressure existing in said first servo means to said second valve chamber of said timing valve means when said first servo means supply pressure reaches a predetermined level.

6. An automatic transmission according to claim 5, wherein said accumulator means comprises piston means having said first servo means supply pressure applied thereto, and spring means acting upon said piston means in opposing relationship to said supply pressure whereby said supply pressure is applied to said second chamber of said timing value means upon a predetemined displacement of said piston means.

* * * * *